July 3, 1956
C. O. CURELL
2,753,018
PANEL ASSEMBLY
Filed Jan. 22, 1952
2 Sheets-Sheet 1
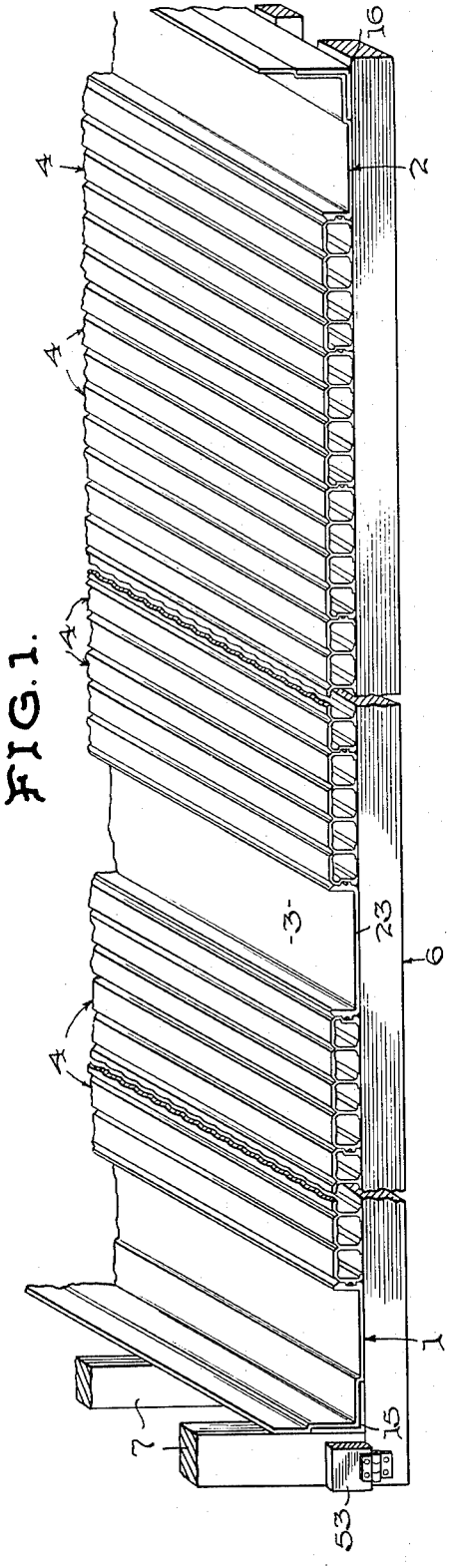
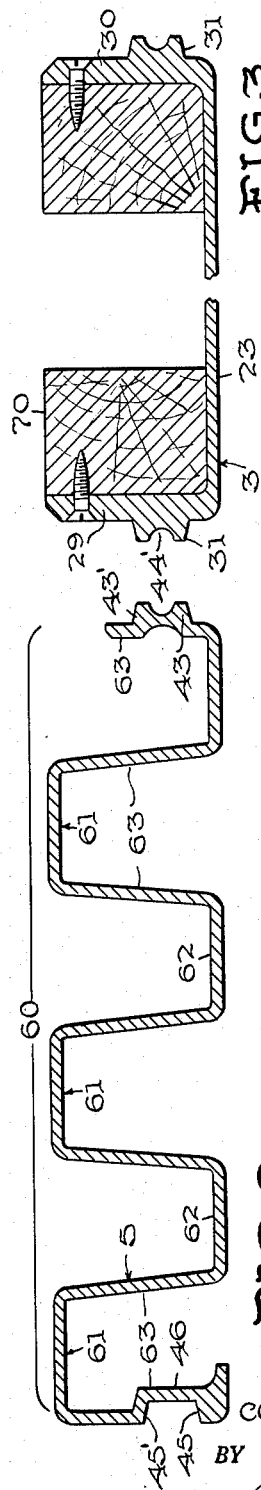
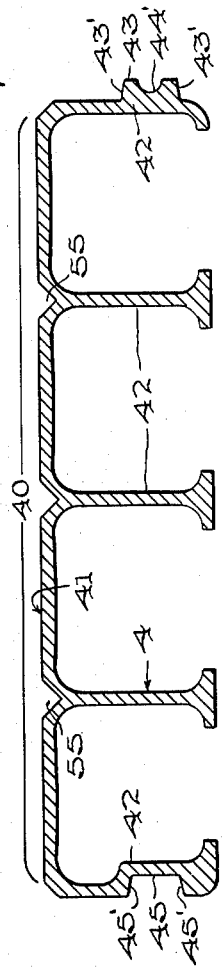
INVENTOR.
CONRAD O. CURELL
BY
James E. Tooney
ATTORNEY July 3, 1956
C. O. CURELL
2,753,018
PANEL ASSEMBLY
Filed Jan. 22, 1952
2 Sheets-Sheet 2
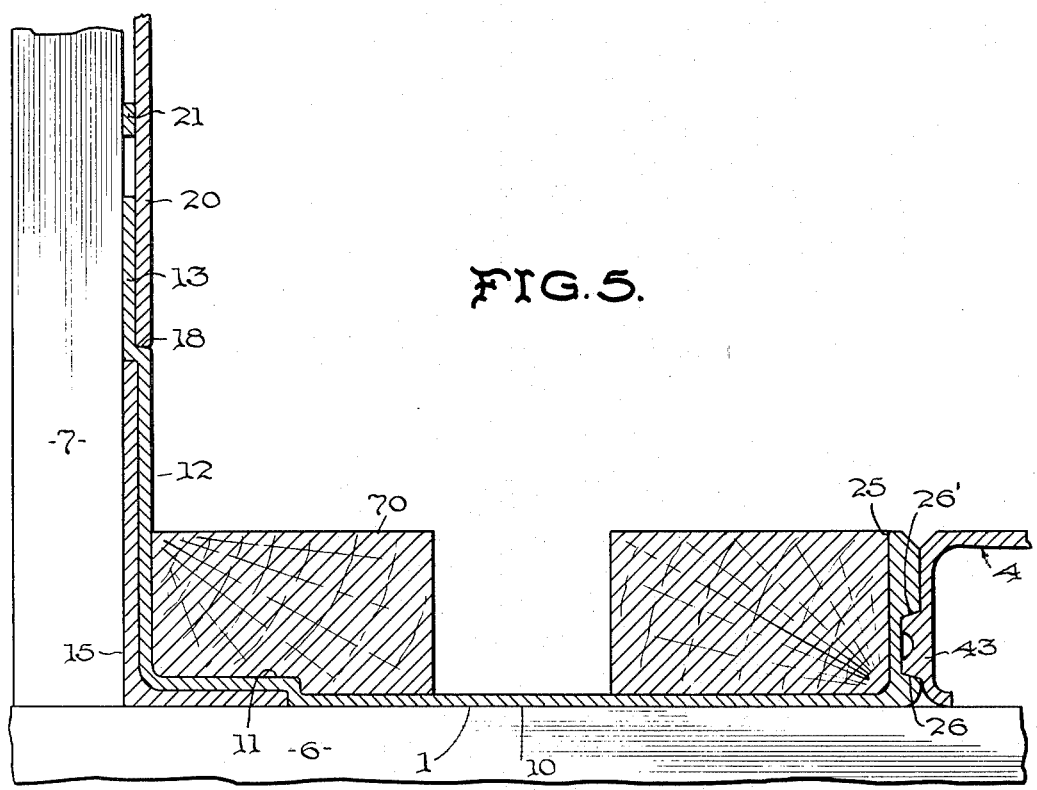
FIG. 5.
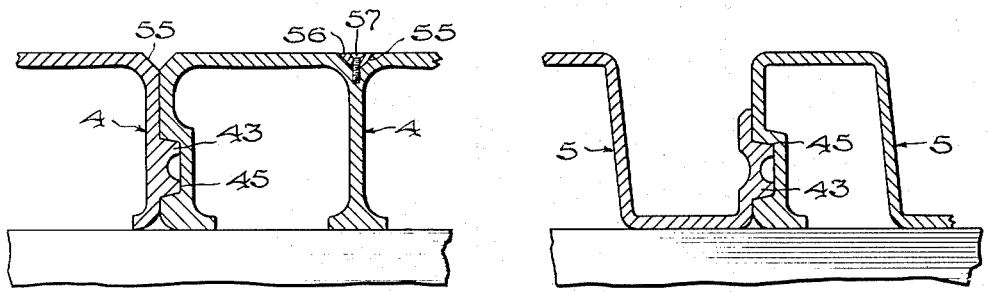
FIG. 6.
FIG. 7.
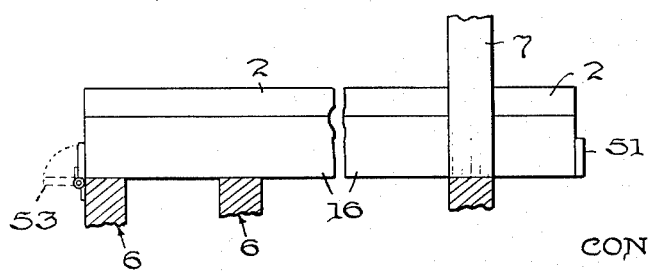
FIG. 8.
INVENTOR.
CONRAD O. CURRELL
BY
James E. Toomey
ATTORNEY United States Patent Office 2,753,018
Patented July 3, 1956

2,753,018

PANEL ASSEMBLY

Conrad O. Curell, St. Louis, Mo., assignor to Kaiser Aluminum & Chemical Corporation, Oakland, Calif., a corporation of Delaware Application January 22, 1952, Serial No. 267,567

6 Claims. (Cl. 189—34)

This invention relates to metallic floor assemblies. More particularly it is concerned with providing a metallic floor assembly for vehicles and the like, wherein a plurality of novel and contiguously arranged panel members of extruded metal are employed along with novel means for interlocking the panel members one with another.

Various floor assemblies for vehicles and the like have been previously proposed wherein a plurality of extruded metal panels are utilized. These panels, which made up the floor assemblies, however, have not been completely satisfactory in many respects. For example, the various joints, where the panels were interlocked one with another, were ordinarily exposed, and the parts of the panels which formed the joints projected above the bearing surfaces of the panels, frequently taking the form of reinforcing ribs. Consequently, no truly smooth bearing surface was provided for the cargo carried by the vehicle, and these projecting parts or elements of panels at the joints thereof were a constant source of annoyance, when loading or unloading the vehicle, since they obstructed the freedom of movement of dollies, handtrucks, mechanical fork lift trucks and the like over the bearing surface.

These joints were also not always watertight, particularly at the sides of the vehicle, thereby giving rise to the problem of corrosion of various metallic members on the undercarriage of the vehicle, which were exposed to the moisture and water and other corrosive elements that collected at the side of the vehicle, particularly, when refrigerated and perishable cargo was carried and dripped down upon these exposed members of the undercarriage.

Another disadvantageous feature of the extruded metal floor panels developed in the past resided in the fact that bolts, screws or rivets had to be employed to securely lock one panel to another. As a consequence considerable amounts of time and labor were required to assemble the various sections or panels together. In addition, special tools were also frequently required.

These bolts, screws or rivets also were ordinarily so located in the panels that they jutted upwardly above the bearing surface of the panels and interfered with the freedom of movement of handtrucks, dollies, etc. employed during the loading of the vehicles, in which the panels were installed.

The extruded members designed in the past were also of such a nature that they were not individually or independently readily removable, i. e., they could not be easily removed, without disturbing the remainder of the floor assembly. The configuration and design of the various panels at their joints and the arrangement for keying one panel to another also was such that panels suitable for general cargo could not be easily replaced with alternative panels specially designed for refrigerated cargo without disturbing the entire floor assembly.

Accordingly, it is a primary object of the instant invention to provide a floor assembly comprised of extruded metal panels, of novel design.

A further object of this invention is to provide a floor assembly comprised of panel sections of extruded metal, wherein novel means are provided for interlocking one panel with another so that panel sections suitable for general cargo can be alternately and easily replaced with panel sections designed especially for refrigerated cargo and without disturbing the remainder of the floor assembly.

Another object of this invention is to provide a floor assembly comprised of novel panel sections of extruded metal, wherein novel means are provided for interlocking one panel with another so that the floor assembly will have a relatively smooth bearing surface.

Another object of this invention is to provide a floor assembly comprised of novel panel sections of extruded metal, wherein novel bearing surface reinforcing members may be employed with certain of the panel sections without disturbing the otherwise smooth contour of the overall bearing surface of the floor assembly.

Another object of this invention is to provide a floor assembly, wherein a novel side panel section of extruded metal is employed, which is adapted to be overlapped by the inside side sheathing members of the vehicle, thereby providing watertightness at the sides of the vehicle.

A further object of this invention is to provide novel panel sections of extruded metal, which can be locked together without the use of external fastening elements.

These and other objects are accomplished by providing a floor assembly or supporting surface for a vehicle and the like comprised of a plurality of extruded metal panel members joined together without the use of external fastening elements. These panel members are contiguously arranged on a suitable supporting framework. Certain of these panel members have a web portion provided with a bearing surface, with each end of the web portion terminating in a marginal side flange projecting at a transverse angle to the said bearing surface. One of these marginal side flanges is provided intermediate its ends with an outwardly projecting bulbous key element, and the other marginal side flange is provided intermediate the ends thereof with a channel shaped keyway, whereby the several panel sections may be interlocked together without the use of external fastening elements, when the key element on the one marginal side of one panel section is fitted within the keyway on the opposed marginal side of an adjacent panel section.

The sides of the keys and keyways of the several members may also be advantageously beveled if desired. This permits them to be more easily fitted one within the other. Various means may also be advantageously employed to prevent longitudinal displacement of the various extruded members.

Other objects and advantages of the instant invention will be more readily ascertained by reference to the following detailed description, when taken in conjunction with the appended drawings, wherein:

Figure 1 is a broken perspective view of the vehicle floor assembly of the instant invention showing the general arrangement of the panel sections;

Figure 2 is a cross-sectional view of one type of intermediate panel section, this type of section being employed when the vehicle carries refrigerated cargo;

Figure 3 is a broken cross-sectional view of the U-shaped center panel section, with wooden inserts located therein;

Figure 4 is a cross-sectional view of another type of intermediate panel section, this latter type of section being used when general cargo is carried by the vehicle;

Figure 5 is a cross-sectional view of a side panel section disclosing the arrangement for overlapping the inside sheathing members of the vehicle therewith;

Figure 6 is a cross-sectional view partially broken of two intermediate panels of Figure 4 disclosing how they are joined together;

Figure 7 is a cross-sectional view partially broken of two intermediate panels of Figure 2 disclosing how they are joined together, and Figure 8 is a broken side elevational view of the panel assembly of Figure 1, showing an end locking member for anchoring the panels on the supporting framework and for preventing longitudinal displacement thereof.

By referring to the drawings, and particularly Figure 1, it will be observed that the floor panel assembly of the instant invention is generally comprised of a pair of similarly extruded metal, generally J-shaped, side panel sections or members 1 and 2; an extruded channel U-shaped center panel member 3 and a plurality of interchangeable and extruded, intermediate panel sections 4 and 5. These latter sections are disposed between and connected to the center and side panel sections. Intermediate panel section 4 is utilized, when the vehicle carries general cargo and intermediate panel section 5 replaces panel section 4, when the vehicles carries refrigerated cargo.

All of the above panel sections are adapted to be made of a readily extrudable metal such as, for example, aluminum having the requisite load carrying characteristics and they are suitably mounted upon a conventional supporting framework or undercarriage 6, to which the side ribs 7 of the vehicle are attached.

By referring to Figures 1 and 5, it will be observed that each elongated side panel section 1 and 2 of extruded metal is roughly J-shaped, having an elongated hook portion 10 lying on the supporting framework 6. Elongated hook portion 10 is provided with an indented shoulder element 11. The elongated stem 12 projects upwardly from one end of the elongated hook-like portion and this stem is also provided with a shoulder element 13. Thus, when the two side panel sections 1 and 2 are placed over the metal angles 15 and 16 located on the top of framework 6 at each side thereof in the manner disclosed in Figures 1 and 5, a snug overlapping fit can be had between all members concerned.

The shoulder element 13 on stem 12 by reason of its curvature permits this shoulder at the point 18 thereon to fit snugly against and to be overlapped by the bottom of the inside lining or sheathing element 20 attached to stringers 21, the latter of which in turn are attached in the manner of furring strips to the outside ribs 7 and a flush wall is thus provided at the bottom of each side of the interior of the vehicle.

By means of this overlapping joint between flange 12 of the side panel sections 1 and 2, and the sheathing elements 20 an efficient watertight joint is also effected in the interior of the vehicle at the bottom of the sides thereof, thereby eliminating the serious corrosion problems, which arise when no watertight joint exists and corrosive elements such as moisture and water seep down below the floor assembly to collect on the various metal parts of the undercarriage or frame of the vehicle. This watertight joint at the bottom and inside part of the vehicle also minimizes insulation problems particularly when refrigerated cargo is carried by the vehicle. The ends of the hook-like portions of each J-shaped side panel members 1 and 2 terminate in an upstanding flange 25, and this flange in turn is provided intermediate its ends with a shallow and narrow keyway 26, having sloping sides 26'.

An elongated shallow channel or U-shaped center-panel section 3 of extruded metal is located on the vehicle floor center line. This U-shaped panel section is comprised of a web portion 23, which terminates at both ends in upstanding flanges 29 and 30 of similar configuration. Each of these flanges is provided intermediate the ends thereof with a bulbous key-like portion 31 having slanted sides, the function of which will be described later.

Interposed between each side panel section 1 and 2 and center panel section 3 is one or more intermediate panel sections, depending, of course upon the width of the vehicle body. These intermediate panels are of two types, intermediate panel section 4 being employed where the vehicle is utilized to transport general cargo and intermediate panel section 5 being utilized when the vehicle is employed to transport refrigerated cargo. This latter section, as indicated in Figure 2, is of the corrugated type.

Accordingly, when it is desirable to transport general cargo, one or more intermediate sections 4 are disposed between each side panel section 1 and 2 and center panel section 3, those on the one side being oppositely arranged to those on the other to provide for proper keying of the panel sections together.

Each intermediate panel section 4 is comprised of a web portion 40, which in turn is provided with a bearing surface 41. A plurality of equally spaced supporting flanges or feet 42 project downwardly in depending fashion from bearing surface 41.

One of the side flanges 42 is provided intermediate its ends with a bulbous key-like projection 43. An arcuate elongated slot 44' may also be located in key-like projections 43 as well as in key-like portions 31 of center panel 3 with a consequent savings in metal and without any sacrifice in the strength of these elements. The other side flange 42 is provided intermediate the ends thereof with a keyway 45.

Two contiguous intermediate panels 4 can thus be quickly and conveniently locked together, as indicated in Figure 6, when the key-like portion 43 of one panel section is fitted within the keyway 45 of the adjacent panel. The sides 45' of keyway 45 and sides 43' of key-like portion 43 in the panels are advantageously beveled so as to permit easy insertion of the key-like portions within the keyways.

Intermediate panels 4 can also be attached to the center and side panel sections 1, 2 and 3 in the same manner, as, for example, by inserting the key-like element 43 of an intermediate panel in the keyway 26 on flange 25 of a side panel section and by inserting the key-like element 31 of center panel section 3 within keyway 45 of the intermediate panel contiguously arranged with the center panel section.

In an advantageous embodiment of the invention, the bearing surface 41 of intermediate panel sections 4 may be provided with a plurality of angular recessed portions 55 which may be filled with fillets 56, the tops of which are flush with the bearing surface 41. Suitable fastening members, such as countersunk screws 57, may be employed to anchor these fillets to bearing surface 41. Provision is thus made for additional metal on the bearing surface directly above the point where the feet 42 are attached to the web 40, so as to strengthen and reinforce the panel section at these points. Thus, considerable rigidity and strength is given to the panel at these points without the use of projecting ribs, which extend above the horizontal line of the bearing surface 41, and obstruct the movement of wheeled dollies and handtrucks over the floor assembly.

As indicated in Figures 1 and 8, side panel sections 1 and 2, center panel section 3 and intermediate panel sections 4 are lifted and/or slid into place upon frame work 6 and against the front stop member 51 located in the forward end of the vehicle. The floor assembly completed when an end gate or positioning means, such as bar 53 of suitable design is locked in place at the aft part of the vehicle, so that it abuts the ends of the extruded panel members. The floor assembly is thus held in place and no longitudinal or lateral displacement of the various panel members is possible.

When the vehicle is to carry refrigerated cargo, all that has to be done to prepare the vehicle for transporting refrigerated cargo is to unlock the anchor bar 53 and remove the intermediate panel sections 4 by sliding them longitudinally out of the end of the vehicle and then replacing panels 4 with intermediate panel sections 5 of a corrugated type, without disturbing the remainder of the panel assembly. As in the case of panel section 4, each panel section 5 is also provided with a web portion 60 formed from the closed and open corrugations 61 and 62 which are joined together by the supporting flanges 63.

As in the case of the general cargo intermediate panel section 4, panel section 5 also has keyways and keys of substantially the same configuration as the keys and keyways of panel section 4 so that they may be attached to the side and center panel sections and to each other in the manner previously described and as indicated in Figure 7.

This open corrugation design of intermediate panel section 5 permits a maximum of cooling air to flow beneath the perishable cargo, while the openings at the tops of the corrugations are sufficiently narrow to prevent fouling the small wheels of hand-operated loading dollies and trucks. It also provides the maximum obtainable strength when combined with the above features. In addition, the design of key-like element 43 on panel section 5 is such that when fitted into keyway 45 of an adjacent panel section 5 or keyway 26 on a side panel section, provision is not only made for an efficient seal between the members but in addition the useful load bearing characteristics of the panel assembly is in no way impaired by weak spots therein such as at the place where the members are connected.

By employing the keying arrangement above described for interlocking the several panel sections together wherein the keyways and key-like portions are all located well below and out of contact with the bearing surface of the floor assembly, no parts of the panel sections which form the joints thereof are exposed to damage by the shifting of the cargo during transit and fracture or breaking of the extruded metal portions is minimized. By utilizing the extruded panel sections of the instant invention and assembling them in the manner described it is possible to provide a remarkably strong supporting surface for a vehicle or the like, which is capable of withstanding relatively high concentrated loads, such as are applied to the surface during loading and unloading of the vehicle as well as during transit and no weak spots exist in the floor at the points where one panel member is connected to another, even though no external fastening elements are employed to tie the panels together.

Fracture or damage to the floor assembly because of the design of the panels is reduced to a minimum. Repair or replacement of any of the parts is simple and easy and can be done in a minimum amount of time and without the need of special tools. A clean and neat appearance is also given to the panel assembly.

Nailing strips 70 of wood or other comparable compositions may also be located in the open portions of the side and center panel sections 1, 2 and 3 where they can be attached by means of self-tapping screws or through bolts to produce a level floor. At any time these strips may be replaced without disturbing the continuity of the extruded metal floor by removing the screws and applying new strips. If at any time the operator wishes to hold general cargo in the refrigerated van, this can be done by using the strips as nailing strips. In the preferred embodiment of the invention only one wood strip is located in the side and center panel sections 1, 2 and 3, when the vehicle is used for general cargo and intermediate sections 4 are used. In this case, the wood strip 70 is large enough to fill the opening of each section. However, when the vehicle is used to transport refrigerated cargo, two or more narrow wood strips are placed in the openings in panels 1, 2 and 3, sufficient space being provided between each strip to allow for air circulation therebetween.

It will also be observed that the elimination of external fastening elements for securing one panel to another at the point where they are joined, facilitates in a remarkable way assembly and disassembly of the entire floor panel assembly.

An advantageous embodiment of the invention has been herein shown and described. It is obvious that many changes may be made therein without departing from the spirit and scope thereof as defined by the appended claims.

What is claimed is:

1. An integrated floor construction for cargo carrying vehicles having a load carrying undercarriage structure comprising laterally spaced, longitudinally extending J-shaped side panel members including vertically extending hook portions removably fixed to said undercarriage structure, a plurality of interchangeable, extruded metallic sections disposed in slidably interlocked relation between the hook portions of said J-shaped side panel members and with respect to each other, certain of said sections including load bearing web elements and integral flange elements, said sections defining an unobstructed cargo receiving floor surface, each of said sections and said J-shaped side panel members including cooperating, longitudinally slidable, interlocking means disposed between and below the floor defining surface of said sections, said integrated floor construction further including positioning means engaging an edge of said integral floor preventing relative longitudinal sliding and maintaining said panels in contiguous relation with respect to said J-shaped side panel members and said load carrying undercarriage while permitting selective, sliding removal of given ones of said sections upon removal of said positioning means.

2. An integrated floor construction for cargo carrying vehicles as defined in claim 1 wherein said interchangeable, longitudinally slidable, interlocking sections each comprises a light metal element of corrugated cross sectional configuration having marginal edges including integrally formed slidably interlockable elements, said slidably interlockable elements being disposed between the highest and lowest extent of said corrugated cross sectional configuration.

3. An integrated floor construction for cargo carrying vehicles as defined in claim 1 wherein each of said interchangeable, longitudinally slidable sections comprises a series of generally inverted U-shaped web and flange elements having integrally formed terminal feet and spaced marginal edges, said marginal edges including a longitudinally slidable interlockable means, said interlockable means being disposed below the load bearing surface defined by said web elements.

4. An integrated floor construction for cargo carrying vehicles having a load carrying undercarriage comprising generally J-shaped, laterally spaced, side panel members including vertical hook portions, a centrally disposed generally channel-shaped, trough section disposed on said undercarriage substantially midway between said spaced, J-shaped, side panel members, a plurality of longitudinally slidable interlocking, interchangeable floor sections disposed to either side of said centrally disposed channel-shaped section, said channel-shaped section and the hook portion of said J-shaped side panel members being longitudinally slidably interlocked with those of said floor sections in juxtaposed relation thereto, and positioning means engageable with an end of each of the said J-shaped side panel members, said channel shaped section and said slidably interlocked floor sections, preventing relative longitudinal sliding and maintaining all of said last mentioned elements in contiguous fixed relation, said interlocking sections defining a substantially moisture impenetrable floor portion having an unobstructed load receiving surface, said chanel-shaped section and said J-shaped, side panel members comprising drain members enabling cleaning and removal of moisture and debris.

5. An integrated floor construction for cargo carrying vehicles as defined in claim 4 wherein said interchangeable, longitudinally slidable interlocked sections each comprises a light metal element of corrugated cross sectional configuration having spaced marginal edges, said spaced marginal edges including a longitudinally slidable interlockable means, said longitudinally slidable interlockable means being disposed between the highest and lowest extent of said corrugated cross sectional configuration.

6. An integrated floor construction for cargo carrying vehicles as defined in claim 4 wherein each of said slidably interlockable interchangeable floor sections comprises a series of generally inverted U-shaped web and flange elements having common integrally formed terminal feet and spaced marginal edges, each of said marginal edges including a longitudinally slidable interlockable means disposed below the surface defined by said flange elements.

References Cited in the file of this patent

UNITED STATES PATENTS

| | | |
|---|---|---|
| 2,101,056 | Frick | Dec. 7, 1937 |
| 2,326,717 | Ziedler | Aug. 10, 1943 |
| 2,478,993 | Wing | Aug. 16, 1949 |